(12) United States Patent
Goldman

(10) Patent No.: US 6,956,857 B2
(45) Date of Patent: Oct. 18, 2005

(54) GUARANTEED ADMISSION AND INCREMENTAL BANDWIDTH ALLOCATION IN A PACKET NETWORK

(75) Inventor: Stuart O. Goldman, Scottsdale, AZ (US)

(73) Assignee: Lucent Technologies Inc., Murray Hill, NJ (US)

( * ) Notice: Subject to any disclaimer, the term of this patent is extended or adjusted under 35 U.S.C. 154(b) by 935 days.

(21) Appl. No.: 09/961,773

(22) Filed: Sep. 24, 2001

(65) Prior Publication Data

US 2003/0058851 A1    Mar. 27, 2003

(51) Int. Cl.[7] ............................................. H04L 12/28
(52) U.S. Cl. .................... 370/395.2; 370/468
(58) Field of Search ............. 370/395.2, 395.21, 370/395.3, 395.41, 229, 230, 235, 468

(56) References Cited

U.S. PATENT DOCUMENTS

| | | | | |
|---|---|---|---|---|
| 6,075,772 | A | * | 6/2000 | Brown et al. ................ 370/235 |
| 6,631,118 | B1 | * | 10/2003 | Jones .......................... 370/252 |
| 6,711,129 | B1 | * | 3/2004 | Bauer et al. ................. 370/230 |
| 6,771,648 | B1 | * | 8/2004 | Kim et al. ................ 370/395.2 |
| 6,785,252 | B1 | * | 8/2004 | Zimmerman et al. ....... 370/337 |
| 6,791,946 | B1 | * | 9/2004 | Suzuki .................... 370/236.2 |
| 6,804,227 | B1 | * | 10/2004 | Sone et al. .................. 370/368 |

* cited by examiner

*Primary Examiner*—Chau Nguyen
*Assistant Examiner*—Blanche Wong
(74) *Attorney, Agent, or Firm*—David J. Zwick

(57) ABSTRACT

In a packet network, a feature wherein each node in the call path grants immediate admission to the network at a possibly reduced or even zero initial bandwidth. Additional bandwidth is incrementally allocated to the call as it becomes available until the maximum requested bandwidth has been allocated to the call for each node in the call path.

45 Claims, 1 Drawing Sheet

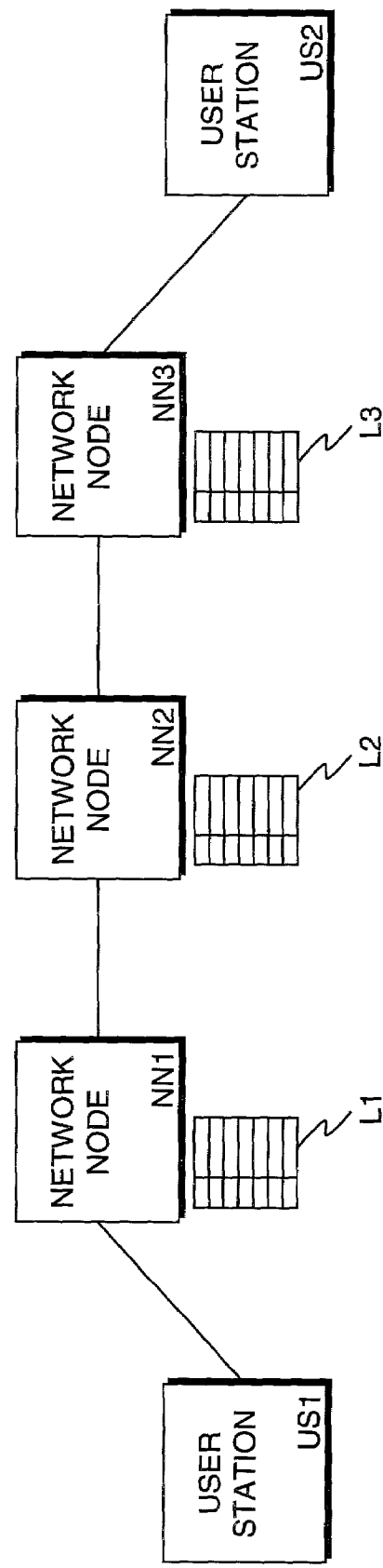

GUARANTEED ADMISSION AND INCREMENTAL BANDWIDTH ALLOCATION IN A PACKET NETWORK

FIELD OF INVENTION

The present invention relates to the field of packet networks, and more particularly to the area of bandwidth allocation during a session or connection.

BACKGROUND OF THE INVENTION

In a packet network, a scheme must be implemented to avoid congestion. A simple solution would be to over-engineer the network such that congestion is not a problem. While this will serve to alleviate congestion, it can be very expensive and is often a short-term solution at best, as additional traffic growth can quickly overwhelm the network. Other solutions are typically network based and fall under the categories of bandwidth and traffic management. An example of traffic management would be routing packets over an alternate path in the network to avoid network elements that are experiencing congestion. An example of bandwidth management would be the network negotiating with an end user during session setup such that the bandwidth allocated to the end user will not exceed a given value and will not negatively affect already established sessions.

A brief discussion of network bandwidth management for three popular representative multimedia packet protocols is presented below. The protocols are: H.323 Packet-Based Multimedia Communications Systems, Session Initiation Protocol (SIP), and Asynchronous Transfer Mote (ATM).

H.323 Packet-Based Multimedia Communications Systems

The H.323 protocol describes terminals and other entities that provide multimedia communications services over packet networks which may not provide a guaranteed quality of service. H.323 entities may provide real-time audio, video and/or data communications. Support for audio is mandatory, while data and video are optional. If data and video are supported, the ability to use a specified common mode of operation is required, so that all terminals supporting that media type can interwork.

The packet based network over which H.323 entities communicate may be a point-to-point connection, a single network segment, or an internetwork having multiple segments with complex topologies.

H.323 entities may be used in point-to-point, multipoint, or broadcast configurations. They may interwork with H.310 terminals on B-ISDN, H.320 terminals on N-ISDN, H.321 terminals on B-ISDN, H.322 terminals on Guaranteed Quality of Service LANs, H.324 terminals on GSTN and wireless networks, V.70 terminals on GSTN, and voice terminals on GSTN or ISDN through the use of Gateways. H.323 entities may be integrated into personal computers or implemented in stand-alone customer premise equipment (CPE) devices such as videotelephones.

Operation of a H.323 network is described, inter alia, in standards publications "H.323 Packet-Based Multimedia Communications Systems," November 2000, and "H.225.0 Call Signalling Protocols and Media Stream Packetization for Packet-Based Multimedia Communication Systems," November 2000, both published by the Telecommunication Standardization Sector of the International Telecommunication Union (ITU-T), and both hereby incorporated by reference.

In a typical H.323 network, H.323 endpoints, or terminals, gain access to the network through the services of a Gatekeeper. Among its many functions, a Gatekeeper performs Admission Control in which it authorizes network access based on criteria that include bandwidth, and Bandwidth Control in which it authorizes changes in bandwidth for H.323 calls. The Gatekeeper can control of the number of H.323 terminals permitted simultaneous access to the network, and may reject calls from a terminal due to bandwidth limitations. This may occur if the Gatekeeper determines that there is not sufficient bandwidth available on the network to support the call.

In call setup, requests for bandwidth reservation should take place at the earliest possible phase. A terminal requests access to the network by sending an H.225 Admission Request (ARQ) message to the Gatekeeper. Included in the ARQ message parameters are bandwidth and callType. Parameter bandwidth indicates the bi-directional bandwidth requested for the call, in units of 100 bits per second. For example, a 128 kbit/s call would be signaled as a request for 256 kbit/s. The value refers only to the audio and video payload bit rate excluding headers and overhead. Parameter callType can be used by the Gatekeeper to attempt to determine "real" bandwidth usage.

If the Gatekeeper determines that the network has sufficient available bandwidth to accommodate the terminal's requested bandwidth in the ARQ record (as well as the other capabilities requested by the terminal), the Gatekeeper responds to the terminal with an Admission Confirm (ACF) message, and call setup proceeds or concludes. In some implementations, the ACF message contains an allowed maximum bandwidth for the call that may be less than the requested bandwidth in the ACQ record. If the Gatekeeper determines that there is not sufficient available network bandwidth to accommodate the terminal's requested bandwidth, then the Gatekeeper responds to the terminal with an Admission Reject (ARJ) message.

The H.323 protocol also allows terminals to request of the Gatekeeper, and the Gatekeeper to request of terminals, changes in bandwidth. This is accomplished by a terminal sending an H.225 Bandwidth Request (BRQ) message to the Gatekeeper, and the Gatekeeper responding to the terminal with either a Bandwidth Confirm (BCF) message, or a Bandwidth Reject (BRJ) message, based on current network bandwidth availability as seen by the Gatekeeper at the time the BRQ message is received. Or, the Gatekeeper sending a BRQ message to a terminal, and the terminal responding to the Gatekeeper with either a BCF message or a BRJ message.

Session Initiation Protocol (SIP)

Session Initiation Protocol (SIP) is an application-layer text-based control protocol that can establish, modify and terminate multimedia sessions or calls. These multimedia sessions include multimedia conferences, distance learning, Internet telephony and similar applications. SIP can "invite" both persons and "robots", such as a media storage service, to a session. SIP can invite parties to both unicast and multicast sessions; the initiator does not necessarily have to be a member of the session to which it is inviting. Media and participants can be added to an existing session. SIP can be used to initiate sessions as well as invite members to sessions that have been advertised and established by other means.

Session Description Protocol (SDP) is used in conjunction with SIP for describing multimedia sessions for the purposes of session announcement, session invitation, and other forms of multimedia session initiation.

SIP and SDP are described in the Internet Engineering Task Force standards documents "RFC 2543—SIP: Session Initiation Protocol," March 1999, and "RFC 2327—SDP: Session Description Protocol," March 1999, both published by The Internet Society, and both hereby incorporated by reference.

A successful two-party call setup consists of two messages: an INVITE followed by an ACK. The INVITE message asks the callee to join a call. After the callee has agreed to participate in the call, the caller confirms that it has received that response by sending an ACK message.

The INVITE request typically contains a session description written in SDP format that provides the called party with enough information to join the call. The session description enumerates the media types and formats that the caller is willing to use and where it wishes the media data to be sent. If the callee wishes to accept the call, it responds to the invitation by returning a similar session description listing the media it wishes to use.

The ACK request may contain a message body with the final session description to be used by the callee. If the ACK message body is empty, the callee uses the session description in the INVITE request.

Changes to existing calls, including increasing or decreasing maximum bandwidth, may be made through the exchange of a new set of INVITE and ACK messages, based on availability at the time the new INVITE message is sent.

Among the session descriptors of the INVITE message is a bandwidth type descriptor ("b="). This specifies the proposed maximum bandwidth to be used by the call, as expressed in kilobits per second. Negotiation between the caller and callee for an acceptable bandwidth is possible. Lower layer network protocols can also negotiate or reject the call based on network bandwidth considerations.

Asynchronous Transfer Mode (ATM)

An ATM network consists of ATM nodes connected by point-to-point ATM links. Each ATM node supports user-network interfaces (UNI) and network-node interfaces (NNI). UNI are interface points between ATM end users and private ATM nodes, or between private ATM nodes and the public carrier ATM network. NNI are any physical or logical links across which two ATM nodes exchange the NNI protocol.

ATM networks transmit information in fixed length 53-byte cells that are comprised of a 5-byte header and a 48-byte payload. A lower level protocol layer called the ATM Adaptation Layer (AAL) is responsible for the segmentation and reassembly of longer message types from higher level protocol layers.

ATM networks are fundamentally connection oriented. A virtual circuit, comprising a series of connections between nodes, needs to be set up across the ATM network before any data is exchanged between end users. Connections between nodes are referred to as virtual paths and virtual channels. A virtual channel is a connection between two communicating ATM users. All communications between the two users for the duration of the session takes place over the established virtual channel. A virtual path is a bundle of virtual channels that is carried between two points in the ATM network. A virtual channel may traverse many virtual paths in the ATM network. In the ATM cell header, the virtual channel identifier (VCI) and the virtual path identifier (VPI) have local significance only across a particular link between nodes, and are remapped, as appropriate, at each node.

An ATM user desiring to establish a connection with another user sends a connection request signaling message containing the calling and called party addresses to the network. Based on the called party address, the signaling is routed through the network node-by-node setting up connection identifiers until it reaches the destination end user. The destination end user can either accept and confirm the connection request, or can reject it and clear the connection. Because the connection is set up along the path of the connection request, the call data also flows along this same path.

Operation of an ATM node is basically very simple. The node receives a cell across a link on a known VCI/VPI value. The node then looks up the connection value in a local translation table to determine the outgoing port (or ports) of the connection and the new VCI/VPI value of the connection on that link. The node then retransmits the cell on that outgoing link with the appropriate connection identifiers. One reason that the basic node operation is so simple is because the connection values in the local translation tables are established automatically through the signaling protocol during the connection request signaling function before the transmittal of any data.

During call setup, a user requesting a connection can request a certain bandwidth and Quality of Service (QoS) from the network and can be assured that the network will deliver that bandwidth and QoS for the life of the connection. When a connection request is received by the node, the node performs a function known as Connection Admission Control (CAC). Based upon the traffic parameters and requested QoS of the connection, the node establishes the connection only if it will not result in the violation of QoS guarantees of already established connections. The CAC function is aided by a feature of the ATM protocol in which nodes flood QoS and reachability information so that all nodes obtain knowledge about reachability within the network and the available traffic resources within the network.

Operation of the ATM protocol is described, inter alia, in standards publications "ATM User-Network Interface (UNI) Signalling Specification," Version 4.0, af-sig-0061.000, July 1996, and "Traffic Management Specification," Version 4.1, AF-TM-0121.000, March 1999, both published by The ATM Forum, and ITU-T Q.2931, "Broadband Integrated Services Digital Network (B-Isdn)—Digital Subscriber Signalling System No. 2 (DSS 2)—User-Network Interface (UNI) Layer 3 Specification For Basic Call/Connection Control," published by the Telecommunication Standardization Sector of the International Telecommunication Union (ITU), February 1995, all thereof which are hereby incorporated by reference.

The three protocols described above, and indeed most packet protocols, share some common characteristics in regards to their treatment of bandwidth management. In all these protocols, an end user requests admission to the network, specifying certain session requirements such as maximum bandwidth and QoS. In all these protocols, there is some form of an admission control function whereby the network determines if the user connection request can be satisfied without adversely affecting network congestion. If the network cannot accommodate the user connection, the request is rejected. If the network can accommodate the user connection, admission is granted and the user is generally limited to the maximum bandwidth requested. Usually, bandwidth changes may be requested, based on availability at the time that the request is made.

With greater integration and utilization of multimedia packet protocols comes greater reliance on these networks. There is a problem in the existing multimedia packet protocols in that during periods of network congestion, connections that a user might deem as important could be rejected through the admission control function. It would be desirable to the user, and a source of revenue to the service provider, if there were a premium service offering available in which a subscriber could be guaranteed admission to the network, at a possibly reduced initial bandwidth allocation, and incrementally allocated the requested bandwidth as bandwidth becomes available.

SUMMARY OF THE INVENTION

Accordingly, it is an object of the present invention to provide a service feature to packet network sessions such that such a session will be guaranteed admission to the network, at a possibly reduced initial bandwidth allocation, and incrementally allocated additional bandwidth as bandwidth becomes available until the session has been allocated the requested bandwidth.

The present invention is an enhanced service offering in a packet network that is implemented in the end user node as well as each packet node of the call path. The service offering provides subscribers immediate admission to the network at a possibly reduced, or even zero, initial bandwidth. Each node in the call path grants the subscriber immediate admission to the network at a possibly reduced, or even zero, initial bandwidth. If the user's requested maximum bandwidth is not available at the time of call setup, then additional bandwidth is incrementally allocated to the call as it becomes available until the requested bandwidth has been allocated for each node along the call path.

DESCRIPTION OF THE DRAWINGS

The FIGURE shows a block diagram of a general embodiment of the present invention.

DESCRIPTION OF EXEMPLARY EMBODIMENTS

The guaranteed admission and incremental bandwidth feature of the present invention is a service offering in packet networks that allows a call (or session or connection) to receive immediate access to the network with a possibly reduced or zero initial bandwidth allocation. If the call is not initially allocated the requested bandwidth, the call receives one or more additional bandwidth allocations as bandwidth becomes available until the call has been allocated the maximum bandwidth requested. Bandwidth allocation to the call is not reduced during the period that the call is active.

This feature is implemented as a protocol enhancement on network nodes, such as switches, routers, gatekeepers, user terminals, etc. The specific encoding of the protocol messages will vary by protocol, and hardware implementations may vary by user terminal and node manufacturer. Not all nodes in a network are required to have the feature. The feature is at least required on some nodes in the call path for the feature to apply on those portions of the call path. If all nodes in the call path do not have the feature, then the call may be denied access to the network if bandwidth is not available at those nodes that do not have the feature. In the preferred embodiments, all nodes in the call path have the feature. Implementations should be compatible with existing protocols.

All implementations share some common attributes. In the preferred embodiment, the subscriber's source user terminal initiates the call to a destination user terminal and sets an indicator in a call setup message indicating that the guaranteed admission and incremental bandwidth feature is requested. There may be several call setup messages exchanged between the source user terminal, the destination user terminal and the network. It is preferable that the indicator be in the first message that results in the initiation of call admission to the network.

Each node in the call path will recognize the guaranteed admission and incremental bandwidth feature indicator in calls requesting the feature. The edge node, to which the user terminal is connected, or another node in the call path may execute a verification routine to verify that the user subscribes to the feature.

Each node in the call path will preserve and convey the guaranteed admission and incremental bandwidth feature indicator in the call setup message to the next node in the call path.

The call setup message will contain an explicit or implicit maximum bandwidth request. The maximum bandwidth request may be in the form of a specific code or value, or may be implied based on other call parameters, such as requested quality of service.

A node cannot reject a guaranteed admission and incremental bandwidth feature call because of bandwidth allocated to other connections. A node may reject a connection due to other reasons. A node may "suggest" a less congested route.

Each node will admit the call to the network with an initial bandwidth allocation that may be less than the maximum bandwidth requested in the session setup message. This initial bandwidth allocation may be zero.

Each node will automatically incrementally allocate to the guaranteed admission and incremental bandwidth feature call newly available user bandwidth up to the requested maximum bandwidth as bandwidth becomes available if the call was initially allocated less than the maximum bandwidth requested. Equitable allocation schemes may be established to allocate newly available bandwidth among guaranteed admission and incremental bandwidth feature calls.

The above common characteristics describe a system where an end-to-end call path is established for guaranteed admission and incremental bandwidth feature calls, even though some nodes in the call path may not have enough bandwidth available to satisfy the call's requested maximum bandwidth. Some nodes in the call path may have no available bandwidth at the time of call admission. Generally, a node will not deny admission to the network for guaranteed admission and incremental bandwidth feature calls. Exceptions to this rule include, for example, situations where the network is damaged. Regarding the allocation of bandwidth to guaranteed admission and incremental bandwidth feature calls as bandwidth becomes available, allocation schemes may be developed at a node or network level that allocate newly available bandwidth in an equitable manner. For example, all guaranteed admission and incremental bandwidth feature calls may be allocated an equal percentage of newly available bandwidth, or the oldest calls may be allocated bandwidth first. Other calls having a higher priority than the guaranteed admission and incremental bandwidth feature call may be allocated bandwidth first.

Most protocols handle call setup bandwidth allocation requests and subsequent bandwidth change requests instantaneously, i.e., bandwidth allocation and change requests are granted or rejected based on available bandwidth at the time of the request. With the guaranteed admission and incremental bandwidth feature, each network will have some mechanism to track feature calls that have not received bandwidth allocation up to the requested maximum. Specific implementations can vary by protocol and node. In the preferred embodiment, each node will maintain a means to track guaranteed admission and incremental bandwidth feature calls that have not been allocated bandwidth up to their requested maximum. The means to track can include, but is not limited to, such mechanisms as tables, queues, lists, etc.

The guaranteed admission and incremental bandwidth feature is applicable to all levels of service, such as constant or variable bit rate real-time applications having tightly constrained packet delay, delay variation and cell loss requirements, as well as non-real-time service levels with more relaxed delay and cell loss requirements. Since the guaranteed admission and incremental bandwidth feature allocates bandwidth to a call up to a maximum value, an explicit or implicit maximum bandwidth is required for the call.

Although not required for the present invention, the network may send control messages to the end user indicating the bandwidth initially and subsequently allocated to a guaranteed admission and incremental bandwidth feature call. Most protocols send such control messages during call setup and in response to bandwidth change requests. The present invention may adapt existing practices in a protocol. ATM networks offer Available Bit Rate (ABR) service that provides calls access to unused bandwidth. This service is implemented with call associated end-to-end control loops that act as network feedback control mechanisms in which network nodes generate and update a continuous control message stream with bandwidth information that the user terminals use to control their transmit rates. This mechanism could be adapted to provide information to end terminals in an ATM network for guaranteed admission and incremental bandwidth feature calls.

The FIGURE shows a block diagram of a simplified general embodiment of the present invention. User stations US1 and US2 are connected to edge nodes NN1 and NN3, respectively. Network nodes NN1 and NN3 are further connected to network node NN2. Each network node NN1–NN3 maintains a means LS1–LS3, respectively, to track guaranteed admission and incremental bandwidth feature calls that have not been allocated bandwidth up to their requested maximum. The means to track can include, but is not limited to, such mechanisms as tables, queues, lists, etc.

While the implementation details are protocol and vendor specific, some exemplary embodiments for the H.323, SIP and ATM protocols follow.

In an H.323 network, generally a call is started with an Admission Request (ARQ) message from the user terminal followed by a SETUP message. The ARQ message would therefore be a logical place to include an indicator that the call is requesting guaranteed admission and incremental bandwidth service. This indicator could be included, for example, in the nonStandardData field of the ARQ message.

In certain situations, an H0.323 call may be pre-granted admission to the network, and an ARQ message may not be required. For these calls, the guaranteed admission and incremental bandwidth feature indicator could, for example, be included in the User-User information element of the SETUP message.

H.323 nodes would need to maintain a mechanism for tracking guaranteed admission and incremental bandwidth feature calls that have not been allocated bandwidth up to the requested maximum. Each node could maintain a table of such calls, with an entry added at the time of call setup, for each guaranteed admission and incremental bandwidth feature call passing through the node that has not been allocated bandwidth up to the requested maximum. When the call has been allocated the requested maximum bandwidth, the associated entry in the table could be deleted.

As additional bandwidth is allocated to a call, notification to the end user terminals could take place through transmission of BRQ or BCF messages from the gatekeeper to the user terminal referencing the call with an updated bandwidth parameter.

In a SIP network, a session is initiated by the caller sending an INVITE message typically containing a session description written in SDP format. The INVITE message would therefore be a logical place to include an indicator that the call is requesting guaranteed admission and incremental bandwidth service. This information could be included as a session attribute ("a=") in the session description portion of the INVITE message. For example, a new session attribute of a=GABS or a=X–GABS could be defined.

SIP nodes would need to maintain a mechanism for tracking guaranteed admission and incremental bandwidth feature calls that have not been allocated bandwidth up to the requested maximum. Each node could maintain a table of such calls, with an entry added at the time of call setup, for each guaranteed admission and incremental bandwidth feature call passing through the node that has not been allocated bandwidth up to the requested maximum. When the call has been allocated the requested maximum bandwidth, the associated entry in the table could be deleted.

As additional bandwidth is allocated to a call, notification of the end user terminals could take place through transmission of additional INVITE messages referencing the call with an updated bandwidth parameter.

In an ATM network, each ATM cell packet contains a 5 byte header and 48 bytes of payload. In the fourth byte of the header is the 3-bit Payload Type Identifier (PTI) field which is used to indicate the type of information residing in the payload, and also for congestion notification and OAM operations. Currently, code points 6 and 7 of the PTI ('110'b and '111'b) are reserved for future functions. For purposes of the invention, one of these reserved values, for example '111'b, could be used to indicate that an ATM session is requesting guaranteed admission and incremental bandwidth service. Each ATM cell associated with the session, from session setup through teardown, would have a value of '111'b in the PTI field indicating that the session will use the guaranteed admission and incremental bandwidth service feature.

ATM nodes would need to maintain a mechanism for tracking guaranteed admission and incremental bandwidth feature sessions that have not been allocated bandwidth up to the requested maximum. Each node could maintain a table of such sessions, with an entry added at the time of session setup, for each guaranteed admission and incremental bandwidth feature session passing through the node that has not been allocated bandwidth up to the requested maximum. When the session has been allocated the requested maximum bandwidth, the associated entry in the table could be deleted.

As additional bandwidth is allocated to a call, notification of the end user terminals could take place through transmission of Resource Management (RM) messages referencing the call with an updated bandwidth parameter. RM messages are normally used with the Available Bit Rate (ABR) Service Category in end-to-end control loops that provide network resource information to the user terminals. RM messages are allowed on all types of connections (although their use with non-ABR connections is not defined), and their use can easily be adapted to the present invention as a means to provide network feedback to end-user terminals using the guaranteed admission and incremental bandwidth feature.

While the present invention has been shown and described with respect to exemplary embodiments, it will be understood by those skilled in the art that modifications may be made thereto without departing from the scope and spirit of the invention. For example, while the guaranteed admission and incremental bandwidth feature of the present invention is presented in the context of the H.323, SIP and ATM protocols, the invention is not limited to these protocols. The invention may be implemented in any packet based protocol that allows for an admission control function partly or wholly based on requested and available bandwidth. Also, while the preferred embodiments show the use of specific parameters, fields and messages for indicating that the call is a guaranteed admission and incremental bandwidth feature call, and for conveying bandwidth change information to the user stations, any suitable parameter, field or message may be used. It is intended that the scope of the invention be defined by the claims appended hereto and their equivalents.

What is claimed is:

1. A packet based network providing a guaranteed admission and incremental bandwidth feature, a source user terminal and a destination user terminal connected to said network, the source user terminal transmitting a call setup message to said network requesting a connection to the destination user terminal, the call setup message containing an indicator that the call is a guaranteed admission and incremental bandwidth feature call, the call setup message containing an explicit or implicit maximum bandwidth request, said network comprising:
   one or more network nodes;
   said network operated to establish a call path between the source user terminal and the destination user terminal over said one or more network nodes;
   each of said one or more network nodes operated to recognize the guaranteed admission and incremental bandwidth feature indicator in calls requesting the feature;
   each of said one or more network nodes operated to preserve and convey the guaranteed admission and incremental bandwidth feature indicator in the call setup message to the next network node in the call path;
   each of said one or more network nodes operated to admit the guaranteed admission and incremental bandwidth feature call to the network with an initial bandwidth allocation that may be less than the maximum bandwidth requested in the session setup message;
   each of said one or more network nodes operated to automatically incrementally allocate to the guaranteed admission and incremental bandwidth feature call available user bandwidth up to the requested maximum bandwidth as bandwidth becomes available if the call was initially allocated less than the maximum bandwidth requested.

2. A network according to claim 1, wherein one of said one or more network nodes is further operated to perform a subscriber verification function.

3. A network according to claim 1, wherein each of said one or more network nodes is further operated to allocate newly available user bandwidth to guaranteed admission and incremental bandwidth feature calls and to other calls based on equitable bandwidth allocation schemes.

4. A network according to claim 1, wherein each of said one or more network nodes is further operated to transmit control messages to the source and destination end user terminals indicating the bandwidth initially and subsequently allocated to a guaranteed admission and incremental bandwidth feature call.

5. A network according to claim 1, wherein each of said one or more network nodes is further operated in accordance with the H.323 protocol.

6. A network according to claim 5, wherein the indicator that the call is a guaranteed admission and incremental bandwidth feature call is included in the nonStandardData field of the Admission Request (ARQ) message.

7. A network according to claim 5, wherein the indicator that the call is a guaranteed admission and incremental bandwidth feature call is included in the User-User information element of the SETUP message.

8. A network according to claim 5, wherein notification to the source and destination end user terminals of additional bandwidth allocated to the call takes place through transmission of Bandwidth Request (BRQ) messages to the source and destination end user terminals referencing the call with an updated bandwidth parameter.

9. A network according to claim 5, wherein notification to the source and destination end user terminals of additional bandwidth allocated to the call takes place through transmission of Bandwidth Confirm (BCF) messages to the source and destination end user terminals referencing the call with an updated bandwidth parameter.

10. A network according to claim 1, wherein each of said one or more network nodes is further operated in accordance with the Session Initiation Protocol (SIP) and the Session Descriptor Protocol (SDP).

11. A network according to claim 10, wherein the indicator that the call is a guaranteed admission and incremental bandwidth feature call is included in the attribute ("a=") field of the INVITE message.

12. A network according to claim 10, wherein notification to the source and destination end user terminals of additional bandwidth allocated to the call takes place through transmission of additional INVITE messages referencing the call with an updated bandwidth ("b=") parameter.

13. A network according to claim 1, wherein each of said one or more network nodes is further operated in accordance with Asynchronous Transfer Mode (ATM) protocol.

14. A network according to claim 13, wherein the indicator that the call is a guaranteed admission and incremental bandwidth feature call is included Payload Type Identifier (PTI) field of the cell packet header.

15. A network according to claim 13, wherein notification to the source and destination end user terminals of additional bandwidth allocated to the call takes place through transmission of Resource Management (RM) messages referencing the call with an updated bandwidth parameter.

16. A network node providing a guaranteed admission and incremental bandwidth feature in a packet based network, the network establishing a call path that includes said network node between a source user terminal and a destination user terminal connected to the network and in response to the source user terminal transmitting a call setup message to the network requesting a connection to the destination user terminal, the call setup message containing an indicator that the call is a guaranteed admission and incremental bandwidth feature call, the call setup message containing an explicit or implicit maximum bandwidth request, said network node comprising:

functionality operated to recognize the guaranteed admission and incremental bandwidth feature indicator in calls requesting the feature;

functionality operated to preserve and convey the guaranteed admission and incremental bandwidth feature indicator in the call setup message to the next network node in the call path;

functionality operated to admit the guaranteed admission and incremental bandwidth feature call to the network with an initial bandwidth allocation that may be less than the maximum bandwidth requested in the session setup message;

functionality operated to automatically incrementally allocate to the guaranteed admission and incremental bandwidth feature call available user bandwidth up to the requested maximum bandwidth as bandwidth becomes available if the call was initially allocated less than the maximum bandwidth requested.

17. A network node according to claim 16, wherein said network node is further operated to perform a subscriber verification function.

18. A network node according to claim 16, wherein said network node is further operated to allocate newly available user bandwidth to guaranteed admission and incremental bandwidth feature calls and to other calls based on an equitable bandwidth allocation scheme.

19. A network node according to claim 16, wherein said network node is further operated to transmit control messages to the source and destination end user terminals indicating the bandwidth initially and subsequently allocated to the guaranteed admission and incremental bandwidth feature call.

20. A network node according to claim 16, wherein said network node is further operated in accordance with the H.323 protocol.

21. A network node according to claim 20, wherein the indicator that the call is a guaranteed admission and incremental bandwidth feature call is included in the nonStandardData field of the Admission Request (ARQ) message.

22. A network node according to claim 20, wherein the indicator that the call is a guaranteed admission and incremental bandwidth feature call is included in the User-User information element of the SETUP message.

23. A network node according to claim 20, wherein notification to the source and destination end user terminals of additional bandwidth allocated to the call takes place through transmission of Bandwidth Request (BRQ) messages to the source and destination end user terminals referencing the call with an updated bandwidth parameter.

24. A network node according to claim 20, wherein notification to the source and destination end user terminals of additional bandwidth allocated to the call takes place through transmission of Bandwidth Confirm (BCF) messages to the source and destination end user terminals referencing the call with an updated bandwidth parameter.

25. A network node according to claim 16, wherein said network node is further operated in accordance with the Session Initiation Protocol (SIP) and the Session Descriptor Protocol (SDP).

26. A network node according to claim 25, wherein the indicator that the call is a guaranteed admission and incremental bandwidth feature call is included in the attribute ("a=") field of the INVITE message.

27. A network node according to claim 25, wherein notification to the source and destination end user terminals of additional bandwidth allocated to the call takes place through transmission of additional INVITE messages referencing the call with an updated bandwidth ("b=") parameter.

28. A network node according to claim 16, wherein said network node is further operated in accordance with Asynchronous Transfer Mode (ATM) protocol.

29. A network node according to claim 28, wherein the indicator that the call is a guaranteed admission and incremental bandwidth feature call is included Payload Type Identifier (PTI) field of the ATM cell packet header.

30. A network node according to claim 28, wherein notification to the source and destination end user terminals of additional bandwidth allocated to the call takes place through transmission of Resource Management (RM) messages referencing the call with an updated bandwidth parameter.

31. A method in a network node for providing a guaranteed admission and incremental bandwidth feature in a packet based network, the network establishing a call path that includes said network node between a source user terminal and a destination user terminal connected to the network and in response to the source user terminal transmitting a call setup message to the network requesting a connection to the destination user terminal, the call setup message containing an indicator that the call is a guaranteed admission and incremental bandwidth feature call, the call setup message containing an explicit or implicit maximum bandwidth request, said method comprising:

recognizing the guaranteed admission and incremental bandwidth feature indicator in calls requesting the feature;

preserving and conveying the guaranteed admission and incremental bandwidth feature indicator in the call setup message to the next network node in the call path;

admitting the guaranteed admission and incremental bandwidth feature call to the network with an initial bandwidth allocation that may be less than the maximum bandwidth requested in the session setup message;

allocating automatically and incrementally to the guaranteed admission and incremental bandwidth feature call newly available user bandwidth up to the requested maximum bandwidth as bandwidth becomes available if the call was initially allocated less than the maximum bandwidth requested.

32. A method according to claim 31, further comprising performing a subscriber verification function.

33. A method according to claim 31, further comprising allocating newly available user bandwidth to guaranteed admission and incremental bandwidth feature calls and to other calls based on an equitable bandwidth allocation scheme.

34. A method according to claim 31, further comprising transmitting control messages to the source and destination end user terminals indicating the bandwidth initially and subsequently allocated to the guaranteed admission and incremental bandwidth feature call.

35. A method according to claim 31, wherein the network node is operated in accordance with the H.323 protocol.

36. A method according to claim 35, wherein the indicator that the call is a guaranteed admission and incremental bandwidth feature call is included in the nonStandardData field of the Admission Request (ARQ) message.

37. A method according to claim 35, wherein the indicator that the call is a guaranteed admission and incremental bandwidth feature call is included in the User-User information element of the SETUP message.

38. A method according to claim 35, wherein notification to the source and destination end user terminals of additional bandwidth allocated to the call takes place through transmission of Bandwidth Request (BRQ) messages to the source and destination user terminals referencing the call with an updated bandwidth parameter.

39. A method according to claim 35, wherein notification to the source and destination end user terminals of additional bandwidth allocated to the call takes place through transmission of Bandwidth Confirm (BCF) messages to the source and destination user terminals referencing the call with an updated bandwidth parameter.

40. A method according to claim 31, wherein said network node is further operated in accordance with the Session Initiation Protocol (SIP) and the Session Descriptor Protocol (SDP).

41. A method according to claim 40, wherein the indicator that the call is a guaranteed admission and incremental bandwidth feature call is included in the attribute ("a=") field of the INVITE message.

42. A method according to claim 40, wherein notification to the source and destination end user terminals of additional bandwidth allocated to the call takes place through transmission of additional INVITE messages referencing the call with an updated bandwidth ("b=") parameter.

43. A method according to claim 31, wherein said network node is further operated in accordance with Asynchronous Transfer Mode (ATM) protocol.

44. A method according to claim 43, wherein the indicator that the call is a guaranteed admission and incremental bandwidth feature call is included Payload Type Identifier (PTI) field of the ATM cell packet header.

45. A method according to claim 43, wherein notification to the source and destination end user terminals of additional bandwidth allocated to the call takes place through transmission of Resource Management (RM) messages referencing the call with an updated bandwidth parameter.

* * * * *